United States Patent
Matsuyama et al.

(10) Patent No.: US 8,945,294 B2
(45) Date of Patent: Feb. 3, 2015

(54) INK COMPOSITION FOR INKJET RECORDING, INKJET RECORDING METHOD, AND INKJET RECORDED MATERIAL

(75) Inventors: Akihiko Matsuyama, Shizuoka (JP); Hiroshi Gotou, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 205 days.

(21) Appl. No.: 13/611,764

(22) Filed: Sep. 12, 2012

(65) Prior Publication Data

US 2013/0071637 A1   Mar. 21, 2013

(30) Foreign Application Priority Data

Sep. 16, 2011   (JP) .................................. 2011-202719

(51) Int. Cl.
| | | |
|---|---|---|
| *C09D 11/02* | (2014.01) | |
| *B23B 3/10* | (2006.01) | |
| *B41J 2/015* | (2006.01) | |
| *C09D 11/326* | (2014.01) | |
| *B82Y 30/00* | (2011.01) | |

(52) U.S. Cl.
CPC . *B23B 3/10* (2013.01); *B41J 2/015* (2012.01); *C09D 11/02* (2013.01); *C09D 11/326* (2013.01); *B82Y 30/00* (2013.01)
USPC .................... 106/31.86; 106/31.89; 106/31.65

(58) Field of Classification Search
USPC ........................................... 106/31.86, 31.89
See application file for complete search history.

(56) References Cited

U.S. PATENT DOCUMENTS

| | | | | |
|---|---|---|---|---|
| 6,030,440 | A  * | 2/2000 | Sekioka et al. | ............ 106/31.65 |
| 6,193,792 | B1 * | 2/2001 | Fague | ......................... 106/31.65 |
| 2001/0029273 | A1 | 10/2001 | Taniguchi et al. | |
| 2003/0056693 | A1* | 3/2003 | Hayashi et al. | ............... 106/493 |
| 2007/0197685 | A1 | 8/2007 | Aruga et al. | |
| 2008/0092773 | A1 | 4/2008 | Matsuyama | |
| 2008/0233363 | A1 | 9/2008 | Goto | |
| 2009/0035468 | A1* | 2/2009 | Matsuyama et al. | .......... 427/256 |
| 2009/0043028 | A1 | 2/2009 | Matsuyama et al. | |
| 2009/0047431 | A1 | 2/2009 | Hatada et al. | |
| 2009/0098312 | A1 | 4/2009 | Goto et al. | |

(Continued)

FOREIGN PATENT DOCUMENTS

| | | |
|---|---|---|
| JP | 2001-192583 | 7/2001 |
| JP | 3301295 | 4/2002 |

(Continued)

OTHER PUBLICATIONS

U.S. Appl. No. 13/419,642, filed Mar. 14, 2012, Takashi Tamai, et al.

(Continued)

*Primary Examiner* — Veronica F Faison
(74) *Attorney, Agent, or Firm* — Oblon, Spivak, McClellend, Maier & Neustadt, L.L.P.

(57) ABSTRACT

An ink composition having organic pigment particles, a hydrosoluble solvent; a dispersing agent, and water, wherein each of the organic pigment particles has a circularity of 2 nm or less, which is defined as a difference between radii of concentric circumscribing and inscribed circles of a contour of an image of each of the organic pigment particles taken by a transmission electron microscope when a gap between the concentric circumscribing circle and the inscribed circle is least, wherein the inscribed circle has a diameter of from 5 nm to less than 50 nm.

10 Claims, 3 Drawing Sheets

(56) References Cited

U.S. PATENT DOCUMENTS

| | | |
|---|---|---|
| 2009/0176070 A1 | 7/2009 | Goto et al. |
| 2009/0186162 A1 | 7/2009 | Namba et al. |
| 2010/0196601 A1 | 8/2010 | Goto et al. |
| 2010/0196602 A1 | 8/2010 | Koyano et al. |
| 2010/0285287 A1 | 11/2010 | Matsuyama et al. |
| 2010/0295891 A1 | 11/2010 | Goto et al. |
| 2011/0057981 A1 | 3/2011 | Aruga et al. |
| 2011/0164086 A1 | 7/2011 | Ggoto et al. |
| 2011/0205288 A1 | 8/2011 | Matsuyama et al. |
| 2011/0216123 A1 | 9/2011 | Tamai et al. |
| 2012/0098883 A1* | 4/2012 | Matsuyama et al. ............ 347/21 |
| 2012/0207983 A1 | 8/2012 | Matsuyama et al. |
| 2013/0063518 A1* | 3/2013 | Takebayashi et al. .......... 347/20 |

FOREIGN PATENT DOCUMENTS

| | | |
|---|---|---|
| JP | 2003-128955 | 5/2003 |
| JP | 2009-108199 | 5/2009 |

OTHER PUBLICATIONS

U.S. Appl. No. 13/494,222, filed Jun. 12, 2012, Hidefumi Nagashima, et al.

* cited by examiner

INK COMPOSITION FOR INKJET RECORDING, INKJET RECORDING METHOD, AND INKJET RECORDED MATERIAL

This patent application is based on and claims priority pursuant to 35 U.S.C. §119 to Japanese Patent Application No. 2011-202719 filed on Sep. 16, 2011, the entire disclosure of which is hereby incorporated by reference herein.

BACKGROUND OF THE INVENTION

1. Field of the Invention

The present invention relates to an ink composition for inkjet recording, an inkjet recording method, and an inkjet recorded material.

2. Description of the Background Art

Inkjet printers are widely used due to their advantages such as low acoustic noises and low running costs and printers capable of printing color images on plain paper are introduced into the market actively.

However, it is extremely difficult to satisfy all the properties required of images produced using such printers, such as good color reproducibility, abrasion resistance, durability, light resistance, drying property, feathering, color bleeding, duplex printing, and ink discharging stability. As a result, ink is selected based on the particular application.

In general, the ink used inkjet recording is mainly composed of water, with a coloring agent and a wetting agent such as glycerin to prevent clogging. As the coloring agent, dyes are widely used for their coloring and stability. However, the light resistance and water resistance of images produced by using such dye-based ink are inferior.

The water resistance can be improved in some degree by using specialized recording media having an ink absorbing layer, but is not satisfactory at all when it comes to plain paper.

To compensate for such defects, ink using a pigment has begun to be widely used as a coloring agent in recent years. Although the pigment ink is successful and superior to the dye ink with regard to light resistance, water resistance, etc., the coloring is degraded by coherence of light having difference wavelengths and phases produced by multiple reflection of light inside the pigment. Therefore, the pigment ink is inferior to the dye ink in general with regard to the coloring.

In particular, the pigment ink used as ink for inkjet recording causes problems of deterioration of coloring (saturation) on plain paper and gloss on specialized paper.

In an attempt to compensate for such degradation of coloring of the pigment ink, pigment particulates that are coated with resin are used. According to this method, the fixing property and the gas resistance property of the ink are further improved by the resin, and in addition dispersion is greatly stabilized. However, currently, pigment ink is not still on a par with dye ink with regard to gloss.

For example, Japanese Patent No. 3301295 (JP-3301295-B) describes a method of manufacturing particles made of quinacridone, benzimidazolone, and azo pigments, which have a particle diameter of from 10 nm to 70 nm with an aspect ratio of from 1:1 to 1:2.

The aspect ratio regulates the ratio of the minor axis to the major axis. However, the aspect ratio is the same irrespective of the particle form in some cases. For example, it is 1:1 when the particle is a square shape or a star shape. This is fundamentally different from the inkjet ink in which ultra-fine organic particles having a sphere form sterically and a projection cross section of a circle are dispersed as they are, to be able to produce images with excellent color saturation and gloss while having excellent durability and discharging stability.

Japanese Patent Application Publication No. 2009-108199 (JP-2009-108199-A) describes ink having hydroinsoluble coloring material particles with a crystalline structure, a particle diameter of from 5 nm to 40 nm, and a simple dispersion degree of 1.5 or less.

Although this is successful in some degree, the coloring material particles are required to be spherical in shape to improve gloss and color saturation.

Therefore, ink having hydroinsoluble coloring material particles with a crystalline structure, a particle diameter of from 5 nm to 40 nm, and a simple dispersion degree of 1.5 or less is clearly different from ink having organic pigment particles formed to be spherical.

SUMMARY OF THE INVENTION

In view of the foregoing, the present invention provides an ink composition having organic pigment particles, a hydrosoluble solvent; a dispersing agent, and water, wherein each of the organic pigment particles has a circularity of 2 nm or less, which is defined as a difference between radii of concentric circumscribing and inscribed circles of a contour of an image of each of the organic pigment particles taken by a transmission electron microscope when a gap between the concentric circumscribing circle and the inscribed circle is least, wherein the inscribed circle has a diameter of from 5 nm to less than 50 nm.

As another aspect of the present invention, an inkjet recording method is provided which includes discharging the ink composition mentioned above from an inkjet recording device upon application of a thermal energy thereto.

As another aspect of the present invention, an inkjet recording material is provide which is recorded by the ink composition mentioned above.

As another aspect of the present invention, an image is provide which is formed using the ink composition mentioned above.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE PRESENT DISCLOSURE

The present invention is described in detail with reference to the accompanying drawings.

In the development and investigation of the ink for inkjet recording, the present inventors found that in comparison with typical ink having a non-spherical form with a particle diameter of about 100 nm, the ink composition of the present disclosure that contains organic pigments having an inscribed circle having a diameter of 5 nm to less than 50 nm with a circularity of 2 nm or less is better able to achieve the desired combination of superior gloss and color saturation with excellent durability and stable discharge.

The circularity is generally used in JIS B 0621-1984 as an indicator to evaluate the form and the rotation accuracy of mechanical elements for use in parts such as axes and bearings that mechanically rotate and defined as follows: "the circularity is represented by the difference between the radii of two geometrical concentric circles that sandwich a circular object when the gap between the two geometrical concentric circles is minimum."

Figure 3:
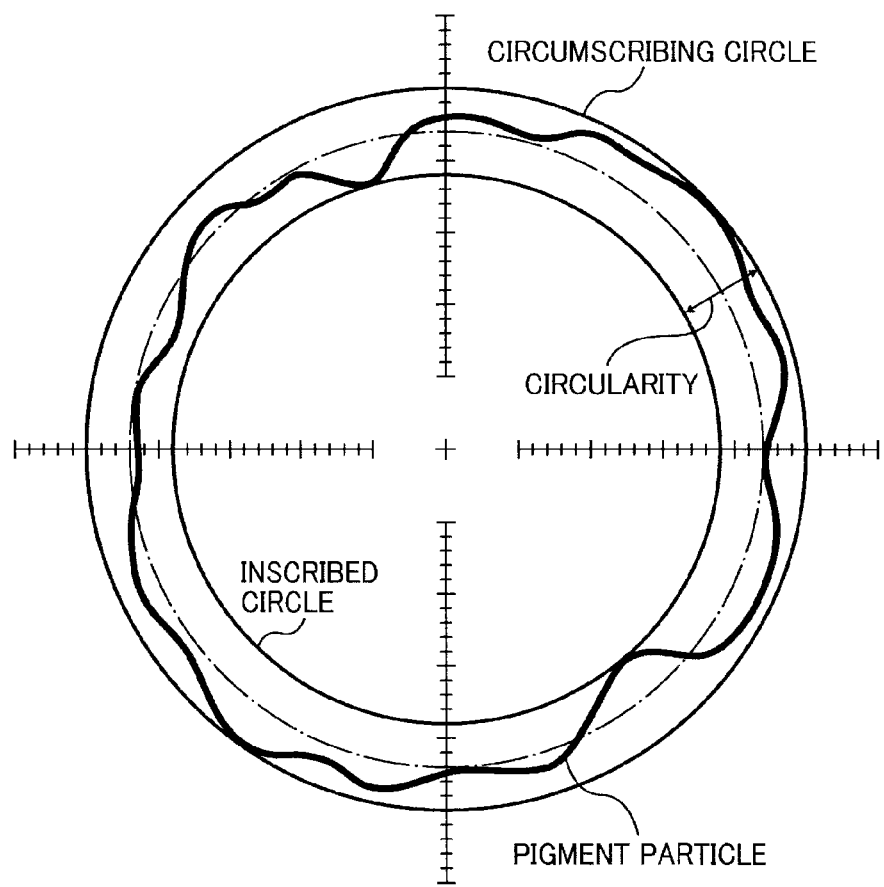
FIG. 3 is a schematic diagram illustrating the circularity of a particle from an image taken by a transmission electron microscope.

FIG. 3 is a schematic diagram illustrating the relationship among the inscribed circle, the circumscribing circle, and the circularity and the circularity is used in the present disclosure as an index to describe spherical particles.

A technology to make fine spherical pigment particles having a particle diameter of from 5 nm to 50 nm was developed recently.

For example, a thin layer reactor sandwiched by rotation disks or a liquid phase laser ablation to conduct microparticulation upon irradiation of laser is used.

That is, it is possible to make fine spherical particles of pigments having a particle diameter of from 5 nm to 50 nm. Therefore, images formed using such pigments are inferred to be improved about gloss.

However, when images are actually formed, the gloss thereof for portions having a high image density with a large attachment amount of the particles deteriorates in some cases.

With regard to this, it is found that this can be improved by filling in the surrounding of the pigment particles with a dispersing agent, in particular a polymer dispersing agent.

Dispersing agents such as polymer dispersing agents fill in the gaps among coloring material particles and particles as the moisture and solvent vaporize and penetrate into a recording medium after discharging and landing the ink on the recording medium.

Therefore, since the gaps among the particles are filled with resins, the probability that light reflected at a pigment particle is absorbed by other pigment particles again becomes low so that the coloring tends not to deteriorate by interference, reflection, and scattering. Therefore, the coloring and gloss closer to those of dyes can be demonstrated by such pigments.

The polymer dispersing agent contributes to prevention of re-agglomeration of organic pigment particulates in the ink.

The ink composition of the present disclosure remains to have a viscosity changing rate of 5% or less after it is preserved in a tough condition for a long period of time (at 50° C. for one month).

The change of the viscosity over time greatly depends on transformation, in particular agglomeration of the organic pigment particles in the ink.

In general, the viscosity represents the flow resistance that a fluid receives and it is well known that the resistance is proportional at least to the square of the particle diameter of the dispersion particle (if the target object is a linear particle which receives the resistance only in its length direction but the resistance increases with the fourth power if the object has a length and width because the resistance is received by a plane).

As for the ink composition of the present disclosure, the change of the viscosity over time is an indicator of the degree of the agglomeration of pigment particles.

The property of the ink composition that the change of the viscosity over time is 5% or less is a great advantage in terms of preservation stability when the ink composition is filled in an ink cartridge as ink for inkjet recording considering that the pigment having an extremely small particle diameter and a high surface activity tends to agglomerate easily.

As described above, the dispersing agents such as polymer dispersing agents not only contribute to prevention of re-agglomeration of organic pigment particulates but also fill in the gaps among coloring material particles and particles as the moisture and solvent vaporize and penetrate after discharging and landing the ink on a recording medium.

Therefore, since the gaps among the particles are filled with resins, the probability that light reflected at a pigment particle is absorbed by other pigment particles again becomes low so that the color tends not to deteriorate by interference, reflection, and scattering. Therefore, coloring and gloss close to those demonstrated by dyes can be obtained by such pigments.

On the other hand, since the pigment has such a small particle diameter, which is close to the range of that of dye ink, there is a concern that the light resistance and gas resistance of the pigment deteriorate. However, if pigments having a particle diameter of from 5 nm to 50 nm have a crystalline property, those properties do not deteriorate significantly and remain satisfactory in comparison with typical pigment ink having a particle diameter of about 100 nm.

Pigment

Organic pigments are used in the present disclosure.

Specific examples of the organic pigments include, but are not limited to, phthalocyanine-based pigments, quinacridone-based pigments, diketopyrrolo pyrrol-based pigments, azo-based pigments, anthraquinone-based pigments, dioxazine-based pigments, indigo-based pigments, thio-indigo-based pigments, perylene-based pigments, isoindolinone-based pigments, aniline black, azomethine-based pigments, and rhodamine B lake pigments.

Specific examples of the yellow pigments include, but are not limited to, C. I. Pigment Yellow 1 (fast yellow G), 2, 3, 12 (disazo yellow AAA), 13, 14, 16, 17, 20, 23, 24, 34, 35, 37, 53, 55, 73, 74, 75, 81, 83 (disazo yellow HR), 86, 93, 95, 97, 98 100, 101, 104, 108, 109, 110, 114, 117, 120, 125, 128, 129, 137, 138, 139, 147, 148, 150, 151, 153, 154, 155, 166, 168, 180, and 185.

Specific examples of the magenta pigments include, but are not limited to, C. I. Pigment Violet 19, C. I. Pigment Red 1, 2, 3, 5, 7, 9, 12, 17, and 22 (brilliant fast scarlet), 23, 31, 38, 48:1 [Permanent Red 2B (Ba)], 48:2 [Permanent Red 2B (Ca)], 48:3 [Permanent Red 2B (Sr)], 48:4 [Permanent Red 2B (Mn)], 49:1, 52:2, 53:1, 57:1 (Brilliant Carmine 6B), 60:1, 63:1, 63:2, 64:1, 81 (Rhodamine 6G Lake), 83, 88, 92, 97, 104, 105, 106, 108 (cadmium red), 112, 114, 122 (dimethyl quinacridone), 123, 146, 149, 166, 168, 170, 172, 175, 176, 178, 179, 180, 184, 185, 190, 192, 193, 202, 209, 215, 216, 217, 219, 220, 223, 226, 227, 228, 238, 240, 255, and 272.

Specific examples of the cyan pigments include, but are not limited to, C. I. Pigment Blue 1, 2, 3, 15 (copper phthalocyanine blue R), 15:1, 15:2, 15:3 (phthalocyanine blue G), 15:4, 15:6 (phthalocyanine blue E), 16, 17:1, 22, 56, 60, 63, and 64, Pat blue 4, and Pat blue 60.

Specific examples of intermediate color pigments include, but are not limited to, C. I. Pigment Red 177, 194, 224, 254, and 264, C. I. Pigment Orange 16, 36, 43, 51, 55, 59, 61, and 71, C. I. Pigment Violet 3, 19, 23, 29, 30, 37, 40, and 50, and C. I. Pigment Green 7 and 36 for red, green and blue.

In the present disclosure, among the pigments specified above, α crystalline type metal free phthalocyanine, α crystalline type copper phthalocyanine, copper phthalocyanine modified by chlorine or bromine, quinacridone modified by methyl or chlorine, and diketopyrrolo pyrrol modified by methyl or chlorine.

Specific examples thereof include, but are not limited to, metal free phthalocyanine (C. I. Pigment Blue 16), copper phthalocyanine, zinc phthalocyanine, and aluminum phthalocyanine.

Among these, copper phthalocyanine is particularly preferable and has crystalline types of α type, β type, γ type, and ε type. Since the properties such as color phase, coloring, stability, and dispersion stability of copper phthalocyanine greatly change by the crystalline type, copper phthalocyanine is selected depending on the purpose of usage.

β type is mainly used as ink for inkjet recording and specific examples thereof include, but are not limited to, C. I. Pigment Blue 15:3 and C. I. Pigment Blue 15:4.

Specific examples of α type include, but are not limited to, C. I. Pigment Blue 15 and C. I. Pigment Blue 15:1.

A specific example of ε type is C. I. Pigment Blue 15:6.

The color phase can be changed toward green by substituting the hydrogen atom outside the four benzene rings of these phthalocyanines with chlorine or bromine. C. I. Pigment Green 7 having 14 or 15 substituted chlorine atoms and C. I. Pigment 36 having 2 to 8 substituted chlorine atoms and 4 to 9 substituted bromine atoms.

In addition, non-substituted quinacridone and quinacridone substituted with methyl or chlorine are suitably used in the present disclosure. A specific example of the non-substituted quinacridone is C. I. Pigment Violet 19. A specific example of the quinacridone substituted with methyl is C. I. Pigment Red 122. Specific examples of the quinacridone substituted with chlorine include, but are not limited to, C. I. Pigment Red 202 and C I Pigment Red 209.

In addition, non-substituted diketopyrrolo pyrrol and diketopyrrolo pyrrol substituted with methyl or chlorine are suitably used in the present disclosure. A specific example of the non-substituted diketopyrrolo pyrrol is C. I. Pigment Red 264. A specific example of the diketopyrrolo pyrrol substituted with chlorine is C. I. Pigment Red 254.

The concentration of the coloring materials in the ink is preferably from 1% by weight to 15% by weight, more preferably from 2% by weight to 12% by weight, and furthermore preferably from 4% by weight to 10% by weight.

When the concentration of the coloring material is too small, the coloring ability tends to be insufficient so that the image density and the saturation tend to be inferior. When the concentration of the coloring material is too large, the preservation stability of the ink tends to deteriorate and the image tends to become dull.

Dispersing Agent

There is no specific limit to the dispersing agent for use in the present disclosure. Any of the dispersing agents for use in preparation of the liquid dispersion of pigment can be suitably used.

For example, nonion surface active agents such as polyoxyethylene isodecyl ether, polyoxyethylene lauryl ether, polyoxyethylene β naphtyl ether, polyoxy ethylene styryl phenyl ether, and polyoxy ethylene distyryl phenyl ether and anion surface active agent such as polyoxyetheylene lauryl ether sulfate ammonium salts, polyoxyetheylene lauryl ether sulfate sodium salts, polyoxyetheylene distyryl phenyl ether sulfate ammonium salts, lauryl ether sulfate ammonium salts, lauryl ether sulfate sodium salts, and distyryl phenyl ether sulfate ammonium salts can be used as the dispersing agents.

In the present disclosure, it is particularly suitable to use a dispersing agent represented by Chemical Structure 1 or Chemical Structure 2.

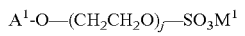  Chemical Structure 1

$A^1\text{-O}-(CH_2CH_2O)_j-SO_3M^1$

  Chemical Structure 2

$A^1\text{-O}-(CH_2CH_2O)_k-H$

In the Chemical Structure 1 and Chemical Structure 2, $A^1$ is selected from the group consisting of a branch-chained or straight-chained alkyl group having 8 to 12 carbon atoms, a β naphtyl group, a styrenized phenol group, and a distyrenized phenol group, j represents an integer of from 10 to 30, k represents an integer of from 20 to 40, and $M^1$ represents an alkali metal selected from the group consisting of Li, Na, and K or a cation group selected from the group consisting of ammonium, tetramethyl ammonium, triethylmethyl ammonium, phosphonium, tetramethyl phosphonium, methanol amine, and ethanol amine.

It is also possible to use polymer dispersing agents such as polyacrylic acids, polymethacrylic acids, copolymers of acrylic acid and acrylonitrile, copolymers of vinyl acetate and an acrylic acid ester, copolymers of acrylic acid and an acrylic acid alkyl ester, copolymers of styrene and acrylic acid, copolymers of styrene and methacrylic acid, copolymers of styrene, acrylic acid, and an acrylic acid alkyl ester, copolymers of styrene, methacrylic acid, and an acrylic acid alkyl ester, copolymers of styrene, α-methyl styrene, and an acrylic acid, copolymer of styrene, α-methyl styrene, and acrylic acid-copolymers of an acrylic acid alkyl ester, copolymers of styrene and maleic acid, copolymers of vinyl naphthalene and maleic acid, copolymers of vinyl acetate and ethylene, copolymers of vinyl acetate and aliphatic acid vinyl ethylene, copolymers of vinyl acetate and a maleic acid ester, copolymers of vinyl acetate and crotonic acid, and copolymers of vinyl acetate and acrylic acid. These can be used alone or in combination.

Liquid dispersion elements can be manufactured by dissolving the dispersing agent specified above in an aqueous medium and adding a coloring pigment to the solution to be wet sufficiently followed by a processing using a Homogenizer for high speed stirring, a mixing and kneading and dispersing machine using balls such as a bead mill or a ball mill, mixing and kneading and dispersing machine applying a shearing force such as a roll mill, an ultrasonic dispersing machine, a microreactor that forms particles by precipitating dissolved pigments, or liquid phase laser ablation for microparticulation by laser beam irradiation.

However, coarse particles tend to remain after the dispersing process, which causes clogging in the inkjet nozzle or the supplying route. Therefore, such coarse particles (e.g., particle diameter: 1 μm or greater) are required to be removed by a filter or a centrifugal.

In the present disclosure, it is preferable to use the dispersing agent in an amount of 10% by weight to 100% by weight and, more preferable, from 20% by weight to 50% by weight based on the coloring pigment.

When the content of the dispersing agent is too small, the pigment tends not to be sufficiently refined.

When the content of the dispersing agent is too large, excessive components that are not adsorbed to the pigments tend to have an impact on the ink properties, resulting in deterioration of image blurring, water resistance, and abrasion resistance.

In addition, the content of the dispersed particulate in the ink is preferably from about 2% by weight to about 20% by weight and more preferably from 3% by weight to 15% by weight based on the total amount of the pigment and the dispersing agent.

Pigment Particle (Polymer Coating)

A method of encapsulating the pigments in polymer particulates is known to disperse the pigments in an aqueous system.

In this case, it is not necessary that all the pigments are encapsulated or adsorbed but some of the pigments may be dispersed in the emulsion unless they have an adverse impact on the dispersion stability.

Specific examples of the polymers forming the polymer emulsions include, but are not limited to, vinyl-based polymers, polyester-based polymers, and polyurethane-based polymers. In particular, the polymers specified in JP-2000-53897-A and JP-2001-139849-A can be suitably used.

Among these, vinyl-based polymers and polyester-based polymers are particularly preferable.

Polyester-Based Polymer

Polyester-based polymers are made by a polycarboxylic acid and a polyalcohol.

Specific examples of the polycarboxylic acids include, but are not limited to, aromatic dicarboxylic acids such as terphthalic acid, isophthalic acid, orthophthalic acid, 1,5-npahthalene diacarboxylic acid, 2,6-naphthalene dicarboxylic acid, diphenic acid, sulfoterephthalic acid, 5-sulfoisophthalic acid, hexahydro phtalic anhydride, 4-sulfophthalic acid, 4-sulfo naphthalene-2,7-dicarboxylic acid, 5,[4-sulfophenoxy]isophthalic acid, and sulfoterephthalic acid; aliphatic dicarboxylic acids such as succinic acid, adipic acid, azelaic acid, sebacic acid, and dodecane dicarboxylic acid; aromatic oxy carboxylic acids, alicyclic dicarboxylic acids, and tri- or higher carboxylic acids.

Specific examples of the polyols include, but are not limited to, aliphacic polyols such as ethylene glycol, propylene glycol, 1,3-propane diol, 2,3-butane diol, 1,4-butane diol, 1,5-pentane diol, 1,6-hexane diol, neopenthyl glycol, diethylene glycol, dipropylene glycol, 2,2,4-trimethyl-1,3-pantane diol, polyethylene glycol, polypropylene glycol, polytetramethylene glycol, trimethylol ethane, trimethylol propane, glycerine, pentaerythritol, 1,4-cyclohexane diol, 1,4-cyclohexane dimethanol, spiroglycol, tricyclo decane diol, tricyclodecane dimetanol, methaxylene glycol, orthoxylene glycol, 1,4-phenylene glycol, bisphenol A, and lactone-based polyester polyols; alicyclic polyols and aromatic polyols.

Vinyl-Based Polymer

There is no specific limit to the vinyl-based polymer. For example, vinyl-based polymers obtained from the following polymerizable monomers can be used.

As the polymerizable monomers, specific examples thereof include, but are not limited to, vinyl-based aromatic hydrocarbons such as styrene, o-methyl styrene, m-methyl styrene, p-methyl styrene, α-methyl styrene, p-ethyl styrene, 2,4-dimethyl styrene, p-tert-butyl styrene, p-chloro styrene, and divinyl benzene; (meth)acrylates such as methyl acrylate, ethyl acrylate, butyl acrylate, n-propyl acrylate, isopropyl acrylate, n-butyl acrylate, isobutyl acrylate, t-butyl acrylate, n-pentyl acrylate, isopentyl acrylate, neopentyl acrylate, 3-(methyl)butyl acrylate, 2-ethylhexyl acrylate, cyclohexyl acrylate, hexyl acrylate, octyl acrylate, nonyl acrylate, decyl acrylate, undecyl acrylate, dodecyl acrylate, phenyl acrylate, methyl methacrylate, n-propyl methacrylate, isopropyl methacrylate, n-butyl methacrylate, isobutyl methacrylate, t-butyl methacrylate, n-pentyl methacrylate, isopentyl methacrylate, neopentyl methacrylate, 3-(methyl)butyl methacrylate, 2-ethyl hexyl methacrylate, hexyl methacrylate, octyl methacrylate, nonyl methacrylate, decyl methacrylate, undecyl methacrylate, and dodecyl methacrylate; unsaturated carboxylic acids such as acrylic acid, methacrylic acid, itaconic acid, and maleic acid; (meth)acrylic acmide, N-substituted maleimide, maleic anhydride, (meth)acrylonitrile, vinyl ketone, vinyl acetate, and vinilydene chloride. Also, resins formed by the polymerizable monomer alone or in combination can be used.

Polymer Coated Pigment Particle

In the present disclosure, microcapsulation to coat pigment particles with hydrophilic polymers or emulsification of the pigment particles can be suitably employed for dispersion in an aqueous medium.

Any known method can be employed to conduct the microcapsulation or emulsification.

Specific examples thereof include, but are not limited to, chemical manufacturing methods, physically manufacturing methods, physically-chemically manufacturing methods and mechanical methods.

To be specific,

Acid deposition method (a method of neutralizing at least a part of the anionic group of an organic polymer having an anionic group to impart hydrosolubility, mixing and kneading it with a coloring material in an aqueous medium, and neutralizing or acidizing the resultant with an acidic compound to precipitate the organic compound to fixate it on the coloring material followed by neutralization for dispersion);

Phase transfer emulsification method (a method of putting water in an organic solvent phase of a mixture containing an anionic organic polymer having a dispersion ability in water and a coloring material or putting the organic solvent phase in water);

Interfacial polymerization method (a method of dissolving two kinds of monomers or reactants in a dispersion phase and a continuous phase separately followed by reaction at the interface therebetween to form a wall film);

In-situ polymerization method (a method of supplying a liquid or gas monomer and a catalyst or two kinds of reactive materials from one side of the continuous phase nuclear particle side to conduct reaction to form a wall film);

Method of coating by curing in liquid (a method of forming a wall film by causing droplets of a polymer solution containing core material particles to be un-dissolved in liquid by a curing agent, etc.);

Coacervation (phase separation) method (a method of forming a wall film by separating a polymer liquid dispersion in which core material particles are dispersed into coacervate (dense phase) having a high polymer concentration and a diluted phase);

Method of drying in liquid (a method of forming a wall film by preparing a liquid dispersion in which a core material is dispersed in a wall-film liquid material and putting the liquid dispersion in a liquid in which the continuous phase of the liquid dispersion is not mixable to obtain a complex emulsion to gradually remove the medium in which the wall-film material is dissolved);

Melting dispersion cooling method (a method of forming a wall film by heating and liquidizing a wall-forming material which is liquidized by heating and solidified at room temperature to disperse core material particles therein and make fine particles from them followed by cooling-down);

Method of suspension coating in air (a method of forming a wall film by suspending core material particles of powder by a fluid bed and mixing coating liquid of the wall-film material by spraying while floating the core material particles in air stream); and Spray drying method (a method of forming a wall film by spraying an encapsulating raw liquid to contact with a heated wind to vaporize and dry the volatile portion thereof). Among them, the phase transfer emulsification method, the acid deposition method, and the interfacial polymerization method are particularly used for inkjet.

Aqueous Solvent

The ink of the present disclosure is prepared by using water as a liquid medium.

As the wetting agent to prevent drying of the ink and improve the dispersion stability, the following aqueous solvents are used. These aqueous solvents can be used alone or in combination.

Specific examples thereof include, but are not limited to the following:

polyols such as glycerin, diethylene glycol, 1,3-butane diol, 3-methyl-1,3-butane diol, triethylene glycol, propylene glycol, dipropylene glycol, trimethylol propane, trimethylol ethane, ethylene glycol, diethylene glycol, dipropylene glycol, tripropylene glycol, tetraethylene glycol, hexylene glycol, polyethyle glycol, polypropylene glycol, 1,5-pentane diol, 1,6-hexane diol, glycerol, 1,2,6-hexane triol, 1,2,4-butane triol, 1,2,3-butane triol, and petriol; polyol alkyl ethers such as ethylene glycol monoethyl ether, ethylene glycol monobutyl ether, diethylene glycol monomethyl ether, diethylene glycol monoetyl ether, diethylene glycol monobutyl ether, tetraethylene glycol monomethyl ether, and propylene glycol monoethyl ether; polyol aryl ethers such as ethylene glycol monophenyl ether, and ethylene glycol monobenzyl ether; nitrogen-containing heterocyclic compounds such as 2-pyrolidone, N-methyl-2-pyrolidone, N-hydroxyethyl-2-pyrolidone, 1,3-dimethyl imidazolidinone, ε-caprolactone, and γ-butylolactone; amides such as formamide, N-methylformamide, N,N-dimethylformamide, N,N-dimethyl-β-methyoxy propion amide, and N,N-dimethyl-β-buthoxy propion amide; amines such as monoethanol amine, diethanol amine, triethanol amine, monoethyl amine, diethyl amine, and triethyl amine; sulfur-containing compounds such as dimethyl sulfoxide, sulfolane, and thiodiethanol; 3-ethyl-3-hydroxymethyl oxetane, propylene carbonate, and ethylene carbonate.

Among these solvents, 3-butane diol, 3-methyl-1,3-butane diol, 3-ethyl-3-hydroxy methyloxetane, N,N-dimethyl-β-methoxy propion amide, and N,N-dimethyl-β-buthoxy propion amide are particularly preferable.

These are excellent to prevent bad spraying performance caused by the solubility and moisture evaporation.

Sugar groups can be also contained in the wetting agent in the present disclosure.

Specific examples of the sugar groups include, but are not limited to, monosaccharides, disaccharides, oligosaccharides (including trisaccharides and tetrasaccharides), and polysaccharides.

Preferred specific examples thereof include, but are not limited to, glucose, mannose, fructose, ribose, xylose, arabinose, galactose, maltose, cellobiose, lactose, saccharose, trehalose, and maltotriose. Polysaccharides represent sugar in a broad sense and are materials that are present widely in nature, for example, α-cyclodextrine and cellulose.

Specific examples of derivatives of these sugar groups include, but are not limited to, reducing sugars, oxidized sugars, amino acid, and thio acid for the sugar groups specified above.

Sugar alcohols are particularly preferable and specific examples thereof include, but are not limited to, maltitol and sorbit.

The blend ratio of the pigment and the wetting agent has a large impact on the discharging stability of ink discharged from a head.

If the blending amount of the wetting agent is too small while the ratio of the solid pigment portion is high, water evaporation around ink meniscus of nozzles tends to be accelerated, resulting in bad discharging performance.

As the wetting agent in the present disclosure, glycerine, 1,3-butane diol, 3-methyl-1,3-butane diol, 3-ethyl-3-hydroxy methyloxetane, N,N-dimethyl-β-methoxy propion amide, and N,N-dimethyl-β-buthoxy propion amide are suitably used to manufacture ink having excellent preservation stability and discharging stability.

The blending ratio of the wetting agent is preferably from 10% by weight to 70% by weight and more preferably from 20% by weigh to 50% by weight based on the ink.

The ink having such a content ratio is extremely good about the test for drying, preservation, and reliability.

Penetrating Agent

By adding a penetrating agent to the ink, the surface tension lowers so that the ink filling property of the ink to the nozzles and the discharging stability ameliorate. In addition, since the ink droplets quickly penetrate into a recording medium after the ink droplets have landed thereon, feathering and color bleeding are reduced.

Surface active agents and solvents having a penetrating property are used as the penetrating agent.

The surface active agents are classified into anionic surface active agents, nonionic surface active agents, and ampholytic surface active agents by hydrophilic group or fluorine-based surface active agents, acetylene-based surface active agents, etc. by hydrophobic group.

Specific examples of the anionic surface active agents include, but are not limited to, polyoxyethylene alkyl ether acetates, dodecyl benzene sulfonates, laurates, and polyoxyethylene alkyl ether sulfates.

Specific examples of the nonionic surface active agents include, but are not limited to, polyols, glycol ethers, polyoxyethylene alkyl ethers, polyoxyethylene alkyl esters, polyoxy ethylene sorbitan aliphatic esters, polyoxyethylene alkyl phenyl ethers, polyoxyethylene alkyl amines, polyoxyethylene alkyl amides, and acetylene glycol.

Specific examples of the fluorine-based surface active agents include, but are not limited to, perfluoroalkyl sulfonic acid salts, perfluoroalkyl carboxylic acid salts, perfluoroalkyl phosphoric acid esters, adducts of perfluoroalkyl ethylene oxide, perfluoro alkyl betaine, perfluoro alkyl amine oxide, and perfluoro alkyl ether compounds.

Among these, the fluoroine-based surface active agents represented by Chemical Structure 3 are particularly preferably used.

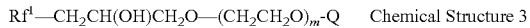

$Rf^1$—$CH_2CH(OH)CH_2O$—$(CH_2CH_2O)_m$-Q    Chemical Structure 3

In the Chemical Structure 3, $Rf^1$ represents —$C_3F_7$ or $C_4F_9$, Q represents —$C_bH_{2b+1}$, where b represents an integer of from 11 to 19, —$CH_2CH(OH)CH_2$—$C_3F_7$, or —$CH_2CH(OH)CH_2$—$C_4F_9$, and m represents an integer of from 20 to 35.

Specific examples of the acetylene glycol-based surface active agents include, but are not limited to, acetylene glycols such as 2,4,7,9-tetramethyl-5-desine-4,7-diol, 3,6-dimethyl-octine-3,6-diol, and 3,5-dimethyl-1-hexine-3-ol {(for example, SURFYNOL® 104, 82, 465, 485, and TG, manufactured by AIR PRODUCTS and CHEMICALS, INC. (US)}. Among these, SURFYNOL® 104, 465, and TG are particularly good to demonstrate good printing quality.

Specific examples of the solvents having a penetrating property include, but are not limited to, polyols having eight or more carbon atoms such as a compound represented by Chemical Structure 4, 2-ethyl-1,3-hexane diol, and 2,2,4-trimethyl-1,3-pentane diol and glycol ethers.

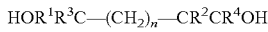  Chemical Structure 4

In the Chemical Structure 4, $R^1$ and $R^2$ independently represent alkyl groups having three to six carbon atoms, $R^3$ and $R^4$ independently represent alkyl groups having one or two carbon atoms, and n represents an integer of from 1 to 6. These surface active agents may be used alone or in combination.

In the present disclosure, it is preferable to use the penetrating agent in an amount of 0.01% by weight to 100% by weight and, more preferable, from 0.03% by weight to 2% by weight based on the entire ink.

When the content of the surface active agent is too small, spreading of dots after printing tends to be poor, i.e., resulting in dots having small diameters so that filling-in in a solid image is not good, thereby degrading the image density and color saturation.

When the content of the surface active agent is too large, the ink tends to foam, which leads to clogging in the flowing path in the nozzle, resulting in prevention of discharging ink.

Known additives such as pH adjustment agents, anti-septic and anti-fungal agents, anti-corrosion agents, anti-oxidants, ultraviolet absorbers, oxygen absorbers, light stabilizers, and anti-kogation agents can be optionally added to the ink composition of the present disclosure.

pH Adjusting Agent

The pH adjusting agent is added to stabilize the dispersion state and discharging by maintaining the ink in the stale of alkali.

However, when the pH is too high, the head of inkjet and an ink supplying unit tends to be dissolved easily, which results in modification, leakage, bad discharging performance of the ink, etc.

It is more desirable to add a pH adjusting agent when the pigment is mixed and kneaded and dispersed together with a dispersing agent in water than when additives such as a wetting agent and a penetrating agent are added after mixing, kneading, and dispersing.

This is because the pH adjusting agent may disrupt the dispersion.

The pH adjusting agent is preferable to contain at least one of an alcohol amine, an alkali metal hydroxide, an ammonium hydroxide, a phosphonium hydroxide, and an alkali metal carbonate.

Specific examples of alcohol amines include, but are not limited to, diethanol amine, triethanol amine, and 2-amino-2-ethyl-1,3-propane diol.

Specific examples of the alkali metal hydroxides include, but are not limited to, lithium hydroxide, sodium hydroxide, and potassium hydroxide.

Specific examples of the ammonium hydroxides include, but are not limited to, ammonium hydroxide, quaternary ammonium hydroxide, and quaternary phosphonium hydroxide.

Specific examples of the alkali metal carbonates include, but are not limited to, lithium carbonate, sodium carbonate, and potassium carbonate.

Anti-septic and Anti-fungal Agent Specific examples of the anti-septic and anti-fungal agents include, but are not limited, dehydrosodium acetate, sodium sorbinate, 2-pyridine thiol-1-oxide sodium, sodium benzoate, and pentachlorophenol sodium.

Specific examples of the chelate reagents include, but are not limited to, ethylene diamine sodium tetraacetate, nitrilo sodium triacetate, hydroxyethyl ethylene diamine sodium triacetate, diethylene triamine sodium quinternary acetate, and uramil sodium diacetate.

Anti-Corrosion Agent

Specific examples of the anti-corrosion agents include, but are not limited to, acid sulfite, thiosodium sulfate, ammonium thiodiglycolate, diisopropyl ammonium nitrite, pentaerythritol quaternary nitride, and dicyclohexyl ammonium nitrite.

Anti-Oxidant

Specific examples of the anti-oxidants include, but are not limited to, phenol-based anti-oxidants (including hindered phenol-based anti-oxidants), amino-based anti-oxidants, sulfur-based anti-oxidants, and phosphorous-based anti-oxidants.

Ultraviolet Absorber

Specific examples of the ultraviolet absorbers include, but are not limited to, benzophenone-based ultraviolet absorbers, benzotriazole-based ultraviolet absorbers, salicylate-based ultraviolet absorbers, cyanoacrylate-based ultraviolet absorbers, and nickel complex salt-based ultraviolet absorbers.

Anti-Kogation Agent

Anti-kogation agents can be added to the ink composition of the present disclosure.

Kogation represents a problematic phenomenon occurring to a thermal head that discharges ink (recording liquid) by utilizing a force of foaming of the ink caused by instant heating upon application of an electric current in a heater. That is, the ink compositions transformed by heating adhere to the heater.

If kogation occurs, the heater cannot conduct heating properly so that the ink discharging weakens and the ink is not discharged at the worst.

Therefore, an anti-kogation agent is added to the ink composition of the present disclosure to prevent kogation.

Specific examples of the anti-kogation agents include, but are not limited to, polyphosphoric acid, polyamino carboxylic acid, aldonic acid, hydroxy carboxylic acid, polyol phosphoric acid esters, and salts thereof, acids having an amino group and salts thereof, and ammonium salts of acids having a methyl group, a methylene group, and a carboxylic group.

Recording Device and Recording Method

The ink composition of the present disclosure can be suitably used in various recording devices employing an inkjet recording system, for example, printers, facsimile machines, photocopiers, and multi-functional machines of these for inkjet recording.

Inkjet recording devices and recording methods are described below.

Figure 1:
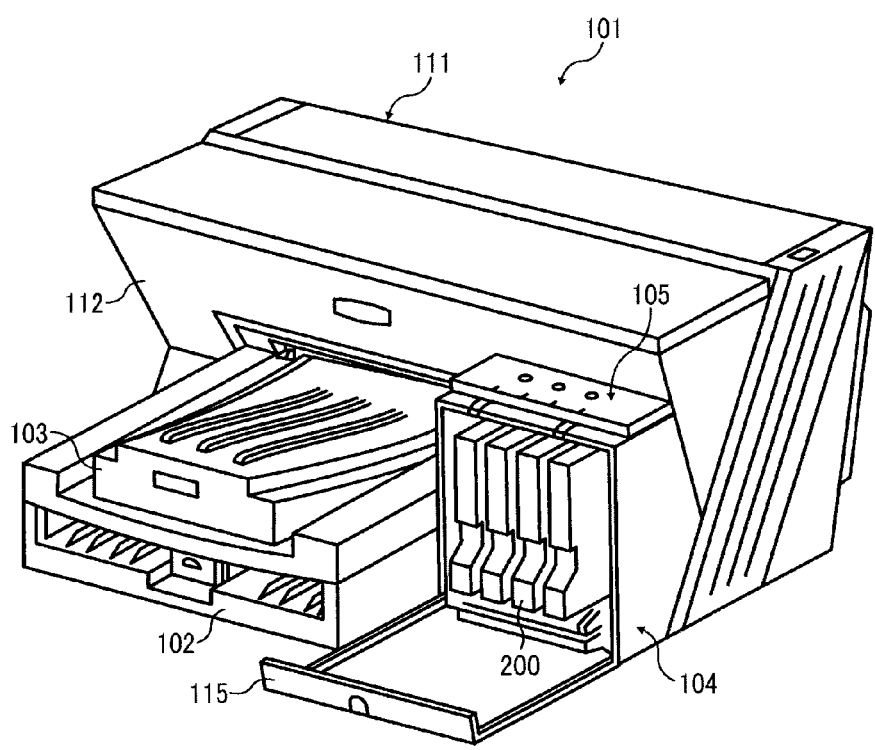
FIG. 1 is a perspective view illustrating an example of an inkjet recording device of the present disclosure in which the cover of the ink cartridge installation unit is open.

The inkjet recording device illustrated in FIG. 1 has a main part 101, a sheet feeder tray 102 to feed recording media placed in the main part 101, a discharging tray 103 attached to the main part 101, which stores the recording media on which images are recorded (formed), and an ink cartridge inserting unit 104.

On the upper surface of the ink cartridge inserting unit 104 is arranged an operating unit 105 such as operation keys and a display.

The ink cartridge inserting unit 104 has a front cover 115 that is openable and closable to detach and attach an ink cartridge 200.

"111" represents an upper cover and "112" represents the front of the front cover.

Figure 2:
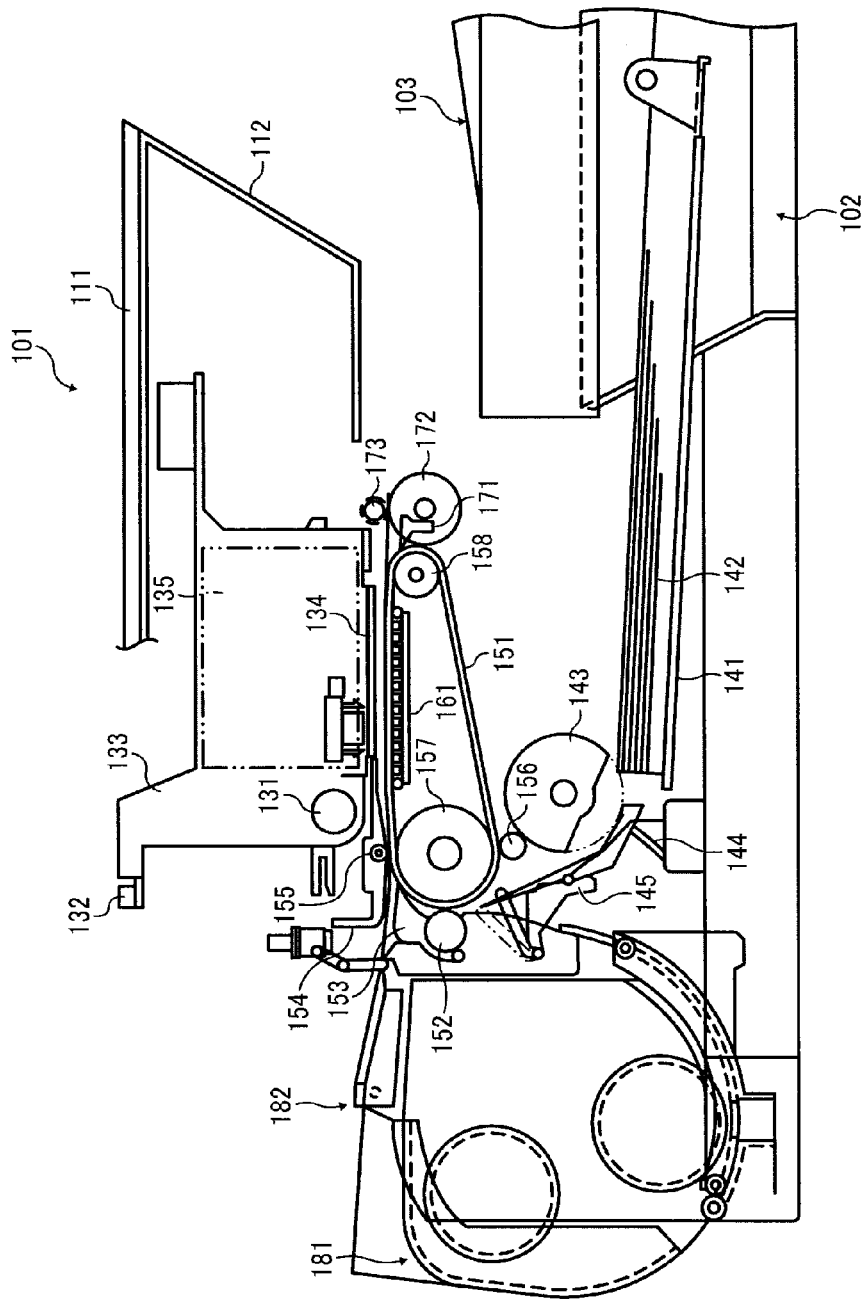
FIG. 2 is a cross section illustrating the entire configuration of the ink jet recording device of FIG. 1.

Inside the main part 101, as illustrated in FIG. 2, a guide rod 131 serving as a guiding member that laterally bridges side plates provided on the right hand side and left hand side and a stay 132 hold a carriage 133 slidably movable in the main scanning direction. A main scanning motor moves the carriage 133 for scanning.

The carriage 133 has a recording head 134 having four inkjet recording heads that discharge ink droplets of each color of yellow (Y), cyan (C), magenta (M), and black (Bk) while multiple ink discharging mouths are arranged in the direction crossing the main scanning direction with the ink droplet discharging direction downward.

As the heads for inkjet recording that form the recording head 134, it is possible to use a device having an energy-generating device to discharge ink such as a piezoelectric actuator such as a piezoelectric element, a thermal actuator that utilizes the phase change caused by film boiling of liquid using an electric heat conversion element such as a heat element, a shape-memory alloy actuator that uses the metal phase change due to the temperature change, and an electrostatic actuator that uses an electrostatic force.

The carriage 133 has a sub tank 135 for each color to supply each color ink to the recording head 134.

The ink for inkjet recording of the present disclosure is supplied and replenished to the sub tank 135 from the ink cartridge 200 mounted onto the ink cartridge inserting unit 104 via a tube for supplying ink.

A sheet feeding unit to feed a sheet 142 loaded on a sheet loader (pressure plate) 141 of the sheet feeder tray 103 includes a half-moon shape roller (sheet feeding roller 143) to separate and feed the sheet 142 one by one from the sheet loader 141 and a separation pad 144 that is made of a material having a large friction index and arranged facing the sheet feeding roller 143 while biased towards the sheet feeding roller 143.

A transfer unit to transfer the sheet 142 fed from the sheet feeding unit on the lower side of the recording head 134 includes a transfer belt 151 to electrostatically adsorb and transfer the sheet 142, a counter roller 152 to transfer the sheet 142 fed from the sheet feeding unit via a guide 145 while pinching the sheet 142 with the transfer belt 151, a transfer guide 153 to make the sheet 142 follow on the transfer belt 151 by changing the transfer direction of the sheet 142 being sent substantially vertically upward by substantially 90°, a front end pressure roller 155 biased towards the transfer belt 151 by a pressure member 154, and a charging roller 156 to charge the surface of the transfer belt 151.

The transfer belt 151 is an endless form belt, suspended between a transfer roller 157 and a tension roller 158 and rotatable in the belt transfer direction.

This transfer belt 151 include, for example, a top layer serving as a sheet adsorption surface made of a resin material such as a copolymer (ETFE) of tetrafluoroethylene and ethylene with no resistance control treatment while having a thickness about 40 μm, and a bottom layer (moderate resistance layer, earth layer) made of the same material as the top layer with resistance control treatment with carbon.

On the rear side of the transfer belt 151, a guiding member 161 is arranged corresponding to the printing area by the e recording head 134.

A discharging unit to discharge the sheet 142 on which images are recorded by the recording head 134 includes a separation claw 171 to separate the sheet 142 from the transfer belt 151, a discharging roller 172, and a discharging roller 173. A discharging tray 103 is arranged below the discharging roller 172.

A duplex printing sheet feeding unit 181 is detachably attached to the rear side of the main part 101.

The duplex printing sheet feeding unit 181 takes in and reverses the sheet 142 that is returned by the reverse rotation of the transfer belt 151 and feeds it again between the counter roller 152 and the transfer belt 151.

A manual sheet feeding unit 182 is provided on the upper surface of the duplex printing sheet feeding unit 181

In this inkjet recording device, the sheet 142 is separated and fed from the sheet feeding unit one by one substantially vertically upward, guided by the guide 145, and transferred while being pinched between the transfer belt 151 and the counter roller 152.

Furthermore, the front end of the sheet 142 is guided by the transfer guide 153 and pressed against the transfer belt 151 by the front end pressure roller 155 to change the transfer direction by substantially 90°.

Since the transfer belt 151 is charged by the charging roller 156 at this point in time, the sheet 142 is electrostatically adsorbed and transferred by the transfer belt 151.

By driving the recording head 134 according to the image signal while moving the carriage 133, the ink droplet is discharged to the sheet 142 not in motion to record an image for an amount corresponding to one line and thereafter the sheet 142 is transferred in a predetermined amount to be ready for the recording for the next line.

On receiving a signal indicating that the recording has completed or the rear end of the sheet 142 has reached the image recording area, the recording operation stops and the sheet 142 is discharged to the discharging fray 103.

When the remaining amount of the ink for inkjet recording in the sub-tank 135 is detected as "approaching to empty", a predetermined amount of the ink for inkjet is replenished to the sub tank 135 from the ink cartridge 200

In this inkjet recording device, it is possible to dissemble the chassis of the ink cartridge 200 and replace the ink bags therein when the ink for inkjet is used up in the ink cartridge 200.

In addition, the ink cartridge 200 stably supplies the ink for inkjet recording even when the ink cartridge 200 is placed upright (on its side) and installed by front loading.

Therefore, even when the main part 101 is blocked upside, for example, it is accommodated in a rack or something is placed on the upper surface of the main part 101, the ink cartridge 200 is easily exchanged.

A serial type (shuttle type) in which the carriage scans is used in this description but this description is true in a line-type inkjet recording device having a line type head.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified

EXAMPLES

Manufacturing of Pigment Dispersion Element
Manufacturing of Dispersion Element 1

Flow deionized water at 5° C. in a flowing amount of 400 ml/min into a thin-layer reactor (microreactor ULREA, manufactured by M Technique Co., Ltd.) sandwiched by rotation disks; and flow a solution at 25° C. in which 30 parts of ECB-301 (C. I. Pigment Blue 15:3: copper phthalocyanine; β crystalline type; no substitution group, manufactured by Dainichiseika Color and Chemicals Mfg. Co., Ltd.) are dissolved in 970 parts of strong sulfuric acid in an amount of 3 ml/min. to the rotation disks to precipitate pigment particles;

Continue the reaction for five hours and repeat operations of concentration of the thus-obtained pigment liquid dispersion by a centrifugal and dilution thereof with deionized water followed by adjusting pH of the resultant to be less than 6 to obtain a pigment paste having a pigment concentration of 30% by weight;

Dissolve 6 parts of a dispersing agent represented by the following Chemical Structure 5 in 44 parts of deionized water; mix the solution with 50 parts of the pigment paste followed by one-hour treatment by an ultrasonic homogenizer; and filtrate the resultant with a filter having an opening size of 1 μm to obtain a Dispersion Element 1 having a pigment concentration of 15% by weight Chemical Structure 5

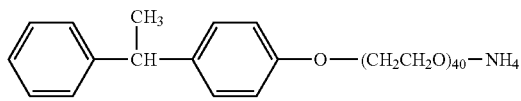

Manufacturing of Dispersion Element 2

Manufacture a Dispersion Element 2 having a pigment concentration of 15% by weight in the same manner as in manufacturing of the Dispersion Element 1 except that the pigment changed to CROMOPHTAL VIOLET GA (C. I. Pigment Violet 23: dioxazine, manufactured by BASF Japan Ltd.) and the dispersing agent is changed to the agent represented by the following Chemical Stricture 6.

Chemical Structure 6

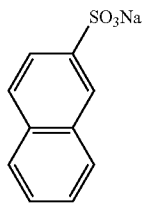

Manufacturing of Dispersion Element 3

Manufacture a Dispersion Element 3 having a pigment concentration of 15% by weight in the same manner as in manufacturing of the Dispersion Element 1 except that the pigment changed to HOSTAPERM BLUE BT-729D (C. I. Pigment Blue 15:1, α crystalline type, no substitution group, manufactured by CLARIANT Japan K.K.) and the dispersing agent is changed to the agent represented by the following Chemical Stricture 2-1.

Chemical Structure 2-1

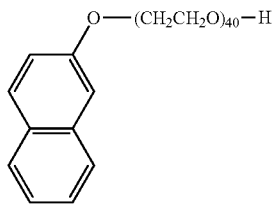

Manufacturing of Dispersion Element 4

Manufacture a Dispersion Element 4 having a pigment concentration of 15% by weight in the same manner as in manufacturing of the Dispersion Element 1 except that the pigment changed to HELIOGEN BLUE D-7490 (C. I. Pigment Blue 16: metal-free phthalocyanine, α crystalline type, no substitution group, manufactured by BASF Japan LTD.) and the dispersing agent is changed to the agent represented by the following Chemical Stricture 1-1.

$C_{12}H_{25}$—O—$(CH_2CH_2O)_{10}$—$SO_3NH_4$   Chemical Structure 1-1

Manufacturing of Dispersion Element 5

Manufacture a Dispersion Element 5 having a pigment concentration of 15% by weight in the same manner as in manufacturing of the Dispersion Element 1 except that the pigment changed to TONER YELLOW 3GP (C. I. Pigment Yellow 155, disazo, manufactured by CLARIANT Japan K.K.) and the dispersing agent is changed to the agent represented by the following Chemical Stricture 1-2.

$C_{12}H_{25}$—O—$(CH_2CH_2O)_{10}$—$SO_3K$   Chemical Structure 1-2

Manufacturing of Dispersion Element 6

Manufacture a Dispersion Element 6 having a pigment concentration of 15% by weight in the same manner as in manufacturing of the Dispersion Element 1 except that the pigment changed to PV FAST ORANGE GRL (C. I. Pigment Orange 43, perinone, manufactured by CLARIANT Japan K.K.) and the dispersing agent is changed to the agent represented by the following Chemical Stricture 1-3

Chemical Structure 1-3

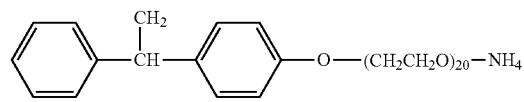

Manufacturing of Dispersion Element 7

Manufacture a Dispersion Element 7 having a pigment concentration of 15% by weight in the same manner as in manufacturing of the Dispersion Element 1 except that the pigment changed to IRGALITE GREEN 6G (C. I. Pigment Green 36: copper phthalocyanine, α crystalline type, substitution group: chlorine and bromine, manufactured by BASF Japan LTD.) and the dispersing agent is changed to the agent represented by the following Chemical Stricture 2-2.

$C_{12}H_{25}$—O—$(CH_2CH_2O)_{30}$—H   Chemical Structure 2-2

Manufacturing of Dispersion Element 8

Manufacture a Dispersion Element 8 having a pigment concentration of 15% by weight in the same manner as in manufacturing of the Dispersion Element 1 except that the pigment changed to CINQUASIA MAGENTA RT-243-D (C. I. Pigment Red 202: quinacridone, substitution group: chlorine, manufactured by BASF Japan LTD.) and the dispersing agent is changed to the agent represented by the following Chemical Stricture 2-3.

Chemical Structure 2-3

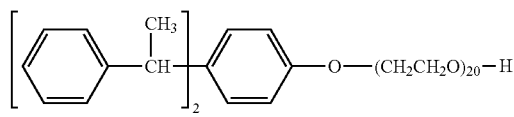

Manufacturing of Dispersion Element 9

Manufacture a Dispersion Element 9 having a pigment concentration of 15% by weight in the same manner as in manufacturing of the Dispersion Element 1 except that the pigment changed to ECR-184 (C. I. Pigment Red 122: quinacridone, substitution group: methyl, manufactured by Dainichiseika Color and Chemicals Mfg. Co., Ltd.) and the dispersing agent is changed to the agent represented by the following Chemical Stricture 1-4.

Chemical Structure 1-4

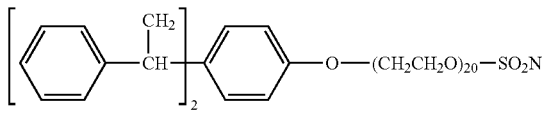

Manufacturing of Dispersion Element 10
Polymer a

| | |
|---|---|
| Epoxyester decanoate (Cardura E-10P, manufactured by Japan Epoxy Resin Company) | 10 parts |
| Adipic acid | 27 parts |
| Hexahydro phthalic anhydride | 42 parts |
| Neopentyl glycol | 2 parts |
| Trimethylol propane | 26 parts |
| Dibutyl tin dioxide | 0.1 parts |

Place the recipe specified above in a flask equipped with a dehydration tube, a thermometer, a nitrogen gas-introducing tube, and a stirrer and heat the system to 180° C. in three hours to conduct dehydration condensation reaction while dehydrating to obtain Polymer a (polyester resin).

Dispersion Element 10

Manufacture a pigment paste having a pigment concentration of 30% by weight whose pH is adjusted to be less than 6 in the same manner as in manufacturing of the Dispersion Element 1 except that the pigment changed to IRGAZIN DPP Red BTR(C. I. Pigment Red 254: diketopyrrolo pyrrol, substitution group: chlorine, manufactured by BASF Japan LTD.).

Add 6 parts of Polymer a and 1 part of 2-amino-2-methyl-1,3-propane diol to 43 parts of deionized water to obtain a solution. Add the pigment paste to the solution for sufficient wetting; and conduct dispersion for 30 minutes by using an ultrasonic homogenizer.

Then, add 3 parts of 1 normal hydrochloric acid to the thus-obtained mill base followed by stirring.

Add 400 parts of deionized water thereto followed by stirring sufficiently. Separate the mixture into the pigment paste and water using a centrifugal followed by removing the supernatant liquid several times.

Then, add 2-amino-2-methyl-1,3-propane diol as a basic compound to the resultant followed by dispersion by the ultrasonic homogenizer again to extract a mill base.

Filtrate the mill base with a filter having an opening of 1 μm to obtain a Dispersion Element 10 having a pigment concentration of 15% by weight

Manufacturing of Dispersion Element 11
Polymer b
Material 1 for Polymer b

| | |
|---|---|
| Styrene | 11.2 parts |
| Acrylic acid | 2.8 parts |
| Lauryl methacrylate | 12.0 parts |
| Polyethylene glycol methacrylate | 4.0 parts |
| Styrene macromer (AS-6, manufactured by TOAGOSEI CO., LTD.) | 4.0 parts |
| Mercapto ethanol | 0.4 parts |

After sufficient replacement with nitrogen gas in a flask equipped with a mechanical stirrer, a thermometer, a nitrogen gas introducing tube, a reflux tube, and a dripping funnel, place the Material 1 for Polymer b therein followed by heating to 65° C.

Material 2 for Polymer b

| | |
|---|---|
| Styrene: | 100.8 parts |
| Acrylic acid | 25.2 parts |
| Lauryl methacrylate | 108.0 parts |
| Polyethylene glycol methacrylate | 36.0 parts |
| Hydroxy ethyl methacrylate | 60.0 parts |
| Styrene macromer (AS-6, manufactured by TOAGOSEI CO., LTD.) | 36.0 parts |
| Mercapto ethanol | 3.6 parts |
| Azobis dimethyl valero nitrile | 2.4 parts |
| Methylethylketone | 18.0 parts |

Thereafter, drop a liquid mixture of the Materials 1 and 2 for Polymer b to the heated flask in 2.5 hours.

After dropping, drop a liquid mixture of 0.8 parts of azobis dimethyl valeronitrile and 18.0 parts of methylethyl ketone to the flask in half an hour.

Subsequent to one-hour aging at 65° C., add 0.8 parts of azobisdimethyl valeronitrile followed by further one-hour aging.

After the reaction is complete, add 364.0 parts of methylethyl ketone to the flask to obtain Polymer b (vinyl resin) solution having a concentration of 50%.

Dispersion Element 11

Flow methanol at −25° C. in a flowing amount of 600 ml/min. into a thin-layer reactor (microreactor ULREA, manufactured by M Technique Co., Ltd.) sandwiched by rotation disks; and flow a solution at 25° C. in which 30 parts of FAST Yellow (C. I. Pigment Yellow 74: monoazo manufacture by Dainichiseika Color and Chemicals Mfg. Co., Ltd.) are dissolved in 770 parts of dimethyl sulfoxide and 200 parts of ethanol solution of 0.1 normal potassium hydroxide in an amount of 10 ml/min. to the rotation disks to precipitate pigment particles.

Continue the reaction for two hours followed by concentration of the thus-obtained pigment liquid dispersion by a centrifugal to obtain a pigment paste having a pigment concentration of 30% by weight.

Stir the pigment and the Polymer b solution sufficiently followed by mixing and kneading with a three-roll mill (NR-84A, manufactured by Noritake Co., Ltd.) 20 times.

Place the thus-obtained paste in 200 parts of deionized water and subsequent to sufficient stirring by an ultrasonic homogenizer, distill away methanol, methylethyl ketone, dimethyl sulfoxide, and water using an evaporator to obtain Dispersion Element 11 having a pigment concentration of 15% by weight.

Manufacturing of Dispersion Element 12

Manufacture a Dispersion Element 12 having a pigment concentration of 15% by weight in the same manner as in manufacturing of the Dispersion Element 1 except that the pigment changed to CINQUASIA VIOLET R RT-101-D (C. I. Pigment Red 19: quinacridone, no substitution group, manufactured by BASF Japan LTD.) and the dispersing agent is changed to EFKA-4520 (modified polyurethane resin, molecular weight: 16,000, manufactured by EFKA Additives Japan).

Manufacturing of Dispersion Element 13 (for Comparison)

Manufacture a Dispersion Element 13 having a pigment concentration of 15% by weight in the same manner as in manufacturing of the Dispersion Element 7 except that the amount of deionized water at 5° C. flowing in the thin-layer reactor (microreactor ULREA, manufactured by M Technique Co., Ltd.) is changed from 400 ml/min to 200 ml/min.

Manufacturing of Dispersion Element 14 (for Comparison)

Manufacture a Dispersion Element 14 having a pigment concentration of 15% by weight in the same manner as in manufacturing of the Dispersion Element 3 except that the amount of deionized water at 5° C. flowing in the thin-layer reactor (microreactor ULREA, manufactured by M Technique Co., Ltd.) is changed from 400 ml/min. to 800 ml/min.

Manufacturing of Dispersion Element 15 (for Comparison)

Manufacture a Dispersion Element 15 in the same manner as in manufacturing of the Dispersion Element 12 except for the following dispersion method.

Dissolve EFKA-4520 (modified polyurethane resin, molecular weight: 16,000, manufactured by EFKA Additives Japan) in deionized water and when CINQUASIA VIOLET R RT-101-D (C. I. Pigment Red 19: quinacridone, no substitution group, manufactured by BASF Japan LTD.) is added to the solution for sufficient wetting, conduct pre-dispersion by an ultrasonic homogenizer for the minutes and thereafter place the resultant in an ultra aspec mill (UAMO 15 type, manufactured by KOTOBUKI INDUSTRIES to conduct dispersion for one hour.

Filtrate the thus-obtained dispersion element with a filter having an opening of 1 μm to obtain a Dispersion Element 15.

The thus-manufactured dispersion elements are shown in Table 1.

TABLE 1

| Examples & Comparative Examples | Pigment dispersion element No. | Pigment | | | | Dispersing agent | | |
|---|---|---|---|---|---|---|---|---|
| | | C.I. No. | skeleton | Crystal | Sub. group | Chemical Structure | j or k | M1 |
| Example 1 | 1 | Pigment Blue 15:3 | Copper phthalocyanine | β type | None | Chemical Structure 5 | 40 | Ammonium |
| Example 2 | 2 | Pigment Violet 23 | Dioxane | — | — | Chemical Structure 6 | 0 | Na |
| Example 3 | 3 | Pigment Blue 15:1 | Copper phthalocyanine | α type | None | Chemical Structure 2-1 | 40 | — |
| Example 4 | 4 | Pigment Blue 16 | Metal-free phthalocyanine | α type | None | Chemical Structure 1-1 | 10 | Ammonium |
| Example 5 | 5 | Pigment Yellow 155 | Disazo | — | — | Chemical Structure 1-2 | 10 | k |
| Example 6 | 6 | Pigment Orange43 | Perinone | — | — | Chemical Structure 1-3 | 20 | Ammonium |
| Example 7 | 7 | Pigment Green 36 | Copper phthalocyanine | α type | Chlorine bromine | Chemical Structure 2-2 | 30 | — |
| Example 8 | 8 | Pigment Red 202 | Quinacridone | — | Chlorine | Chemical Structure 2-3 | 20 | — |
| Example 9 | 9 | Pigment Red 122 | Quinacridone | — | Methyl | Chemical Structure 1-4 | 30 | Na |
| Example 10 | 10 | Pigment Red 254 | Diketo pyrrolo pyrrol | — | Chlorine | Polyester resin (Polymer a) | — | — |
| Example 11 | 11 | Pigment Yellow 74 | Monoazo | — | — | Vinyl resin (Polymer b) | — | — |
| Example 12 | 12 | Pigment Violet 19 | Quinacridone | — | None | Modified polyurethane resin | — | — |
| Comparative Example 1 | 13 | Pigment Green 36 | Copper phthalocyanine | α type | Chlorine bromine | Chemical Structure 2-2 | 30 | — |
| Comparative Example 2 | 14 | Pigment Blue 15:1 | Copper phthalocyanine | α type | None | Chemical Structure 2-1 | 40 | — |
| Comparative Example 3 | 15 | Pigment Violet 19 | Quinacridone | — | None | Modified polyurethane resin | — | — |

Example 1

Preparation of Ink 1

Ink Recipe

| | |
|---|---|
| Dispersion Element 1 | 40.0 parts |
| Glycerin | 20.0 parts |
| 2-pyrolidone | 15.0 parts |
| EMALGEN LS-106 (polyoxyethylene polyoxypropylene alkyl ether, manufactured by KAO CORPORATION) | 1.0 part |
| 0.1 normal KOH aqueous solution | 0.1 parts |
| PROXEL LV (anti-septic and anti-fungal agent, manufactured by AVECIA GROUP) | 0.1 parts |
| Deionized water | 23.8 parts |

Manufacture a vehicle by dissolving the materials specified above other than the Dispersion Element 1 in deionized water, mix it with the Dispersion Element 1, and filtrate the mixture with a filter having an opening size of 1 μm to obtain Ink 1 for inkjet recording.

Example 2

Preparation of Ink 2

Ink Recipe

| | |
|---|---|
| Dispersion Element 2 | 40.0 parts |
| Glycerine | 15.0 parts |
| 3-methyl-1,3-butane diol | 20.0 parts |
| 2-ethyl-1,3-hexane diol | 2.0 parts |
| ZONYL FS-300 (polyoxy alkylene (C2 to C3)-2-perfluoroalkyl (C4 to C16) ethyl ether, solid portion: 40%, manufactured by Du Pont Kabushiki Kaisha) | 1.5 parts |
| 0.1 normal KOH aqueous solution | 0.1 parts |
| PROXEL LV (anti-septic and anti-fungal agent, manufactured by AVECIA GROUP) | 0.1 parts |
| Deionized water | 21.3 parts |

Manufacture a vehicle by dissolving the materials other than the dispersion element 12 in deionized water, mix it with the dispersion element 2, and filtrate the mixture with a filter having an opening of 1 μm to obtain Ink 2 for inkjet recording.

Example 3

Preparation of Ink 3

Ink Recipe

| | |
|---|---|
| Dispersion Element 3 | 40.0 parts |
| Glycerin | 10.0 parts |
| 1,3-butane diol | 25.0 part |
| 2-ethyl-1,3-hexane diol | 2.0 parts |
| ZONYL FS-300 (polyoxy alkylene (C2 to C3)-2-perfluoroalkyl (C4 to C16) ethyl ether, solid portion: 40%, manufactured by Du Pont Kabushiki Kaisha) | 1.5 parts |
| 2-amino-2-ethyl-1,3-propane diol | 0.5 parts |
| PROXEL LV (anti-septic and anti-fungal agent, manufactured by AVECIA GROUP) | 0.1 parts |
| Deionized water | 20.9 parts |

Manufacture a vehicle by dissolving the materials specified above other than the Dispersion Element 3 in deionized water, mix it with the Dispersion Element 3, and filtrate the mixture with a filter having an opening size of 1 μm to obtain Ink 3 for inkjet recording.

Example 4

Preparation of Ink 4

Ink Recipe

| | |
|---|---|
| Dispersion Element 4 | 40.0 parts |
| Glycerin | 10.0 parts |
| 1,3-butane diol | 25.0 parts |
| 2-ethyl-1,3-hexane diol | 2.0 parts |
| Penetrating agent represented by the following Chemical Structure 3-1 | 0.1 parts |

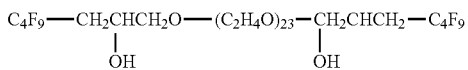

Chemical Structure 3-1

| | |
|---|---|
| 2-amino-2-ethyl-1,3-propane diol | 0.5 parts |
| PROXEL LV (anti-septic and anti-fungal agent, manufactured by AVECIA GROUP) | 0.1 parts |
| Deionized water | 22.3 parts |

Manufacture a vehicle by dissolving the materials specified above other than the Dispersion Element 4 in deionized water, mix it with the Dispersion Element 4, and filtrate the mixture with a filter having an opening size of 1 μm to obtain Ink 4 for inkjet recording.

Example 5

Preparation of Ink 5

Ink Recipe

Manufacture Ink 5 for inkjet recording in the same manner as in Example 4 except that the dispersion element 4 in the ink recipe in Example 4 is changed to the dispersion element 5 and 0.1 parts of the penetrating agent represented by the Chemical Structure 3-1 to 0.1 parts of the penetrating agent represented by the Chemical Structure 3-2.

Chemical Structure 3-2

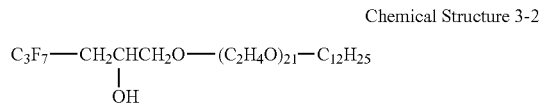

Example 6

Preparation of Ink 6

Ink Recipe

Manufacture Ink 6 for inkjet recording in the same manner as in Example 4 except that the Dispersion Element 4 in the ink recipe in Example 4 is changed to the Dispersion Element 6, 0.1 parts of the penetrating agent represented by the Chemical Structure 4-1 is added, and the amount of the deionized water is reduced.

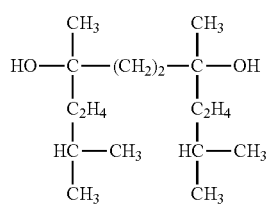

Chemical Structure 4-1

Example 7

Preparation of Ink 7

Ink Recipe

| | |
|---|---|
| Dispersion Element 7 | 40.0 parts |
| Glycerin | 15.0 parts |
| 1,3-butane diol | 10.0 parts |
| N,N-dimethyl-β-methoxy propion amide | 10.0 parts |
| ZONYL FS-300 (polyoxy alkylene (C2 to C3)-2-perfluoroalkyl (C4 to C16) ethyl ether, solid portion: 40%, manufactured by Du Pont Kabushiki Kaisha) | 2.5 parts |

Penetrating agent represented by the following Chemical Structure 4-2

Chemical Structure 4-2

| | |
|---|---|
| 2-amino-2-ethyl-1,3-propane diol | 0.5 parts |
| PROXEL LV (anti-septic and anti-fungal agent, manufactured by AVECIA GROUP) | 0.1 parts |
| Deionized water | 21.8 parts |

Manufacture a vehicle by dissolving the materials specified above other than the Dispersion Element 7 in deionized water, mix it with the Dispersion Element 7, and filtrate the mixture with a filter having an opening size of 1 μm to obtain Ink 7 for inkjet recording.

Example 8

Preparation of Ink 8

Ink Recipe

| | |
|---|---|
| Dispersion Element 8 | 40.0 parts |
| Glycerin | 20.0 parts |
| 3-methyl-1,3-butane diol | 15.0 parts |
| 2-ethyl-1,3-hexane diol | 2.0 parts |
| Penetrating agent represented by the following Chemical Structure 3-2 | 0.05 parts |
| Penetrating agent represented by the following Chemical Structure 4-2 | 0.1 parts |
| 2-amino-2-ethyl-1,3-propane diol | 0.5 parts |
| PROXEL LV (anti-septic and anti-fungal agent, manufactured by AVECIA GROUP) | 0.1 parts |
| Deionized water | 22.75 parts |

Manufacture a vehicle by dissolving the materials specified above other than the Dispersion Element 8 in deionized water, mix it with the Dispersion Element 8, and filtrate the mixture with a filter having an opening size of 1 μm to obtain Ink 8 for inkjet recording.

Example 9

Preparation of Ink 9

Ink Recipe

Manufacture Ink 9 for inkjet recording in the same manner as in Example 8 except that the Dispersion Element 8 in the ink recipe in Example 8 is changed to the Dispersion Element 9 and 3-methyl-1,3-butane diol is changed to 3-ethyl-3-hydroxymethyl oxetane.

Example 10

Preparation of Ink 10

Ink Recipe

| | |
|---|---|
| Dispersion Element 10 | 40.0 parts |
| Glycerin | 10.0 parts |
| 3-methyl-1,3-butane diol | 10.0 parts |
| 3-ethyl-3-hydroxymethyl oxetane | 5.0 parts |
| N,N-dimethyl-β-buthoxy propion amide | 5.0 parts |
| 2-pyrolidone | 5.0 parts |
| 2-ethyl-1,3-hexane diol | 1.0 part |
| ZONYL FS-300 (polyoxy alkylene (C2 to C3)-2-perfluoroalkyl (C4 to C16) ethyl ether, solid portion: 40%, manufactured by Du Pont Kabushiki Kaisha) | 2.5 parts |
| Penetrating agent represented by the Chemical Structure 4-1 illustrated above | 0.1 parts |
| 2-amino-2-ethyl-1,3-propane diol | 0.5 parts |
| PROXEL LV (anti-septic and anti-fungal agent, manufactured by AVECIA GROUP) | 0.1 parts |
| Deionized water | 20.8 parts |

Manufacture a vehicle by dissolving the materials specified above other than the Dispersion Element 10 in deionized water, mix it with the Dispersion Element 10, and filtrate the mixture with a filter having an opening size of 1 μm to obtain Ink 10 for inkjet recording.

Example 11

Preparation of Ink 11

Ink Recipe

| | |
|---|---|
| Dispersion Element 11 | 40.0 parts |
| Glycerin | 15.0 parts |
| 1,3-butane diol | 15.0 parts |
| 2-pyrolidone | 5.0 parts |
| 2-ethyl-1,3-hexane diol | 1.0 part |
| EMALGEN LS-106 (polyoxyethylene polyoxypropylene alkyl ether, manufactured by KAO CORPORATION) | 1.0 part |
| Penetrating agent represented by the Chemical Structure 4-1 illustrated above | 0.1 parts |
| 0.1 normal KOH aqueous solution | 0.1 parts |
| PROXEL LV (anti-septic and anti-fungal agent, manufactured by AVECIA GROUP) | 0.1 parts |
| Deionized water | 22.7 parts |

Manufacture a vehicle by dissolving the materials specified above other than the Dispersion Element 11 in deionized water, mix it with the Dispersion Element 11, and filtrate the mixture with a filter having an opening size of 1 μm to obtain Ink 11 for inkjet recording.

Example 12

Preparation of Ink 12

Ink Recipe

| | |
|---|---|
| Dispersion Element 12 | 40.0 parts |
| Glycerin | 10.0 parts |
| 1,3-butane diol | 10.0 parts |
| N,N-dimethyl-β-methoxy propion amide | 10.0 parts |
| N,N-dimethyl-β-buthoxy propion amide | 5.0 parts |
| 2-ethyl-1,3-hexane diol | 1.0 part |
| Penetrating agent represented by the Chemical Structure 3-1 illustrated above | 0.05 parts |
| 2-amino-2-ethyl-1,3-propane diol | 0.5 parts |
| PROXEL LV (anti-septic and anti-fungal agent, manufactured by AVECIA GROUP) | 0.1 parts |
| Deionized water | 24.35 parts |

Manufacture a vehicle by dissolving the materials other than the dispersion element 12 in deionized water, mix it with the dispersion element 12, and filtrate the mixture with a filter having an opening of 1 μm to obtain Ink 12 for inkjet recording.

Comparative Example 1

Preparation of Ink 13

Ink Recipe

Manufacture ink 13 for inkjet recording in the same manner as in Example 7 except that the Dispersion Element 7 is changed to the Dispersion Element 13.

Comparative Example 2

Preparation of Ink 14

Ink Recipe

Manufacture Ink 14 for inkjet recording in the same manner as in Example 3 except that the Dispersion Element 3 is changed to the Dispersion Element 13.

Example 3

Preparation of Ink 15

Ink Recipe

Manufacture Ink 15 for inkjet recording in the same manner as in Example 12 except that the Dispersion Element 12 is changed to the Dispersion Element 15.

The compositions of the thus-manufactured ink are shown in Table 2.

TABLE 2

| | | Ink composition | | | | | | | |
|---|---|---|---|---|---|---|---|---|---|
| | Dispersion element | | Aqueous solvent | | | | | | |
| | | | GLY | 13BD | MBD | EHO | DMMPA | DMBPA | 2P |
| Example 1 | 1 | 40% | 20% | | | | | | 15% |
| Example 2 | 2 | 40% | 15% | | 20% | | | | |
| Example 3 | 3 | 40% | 10% | 25% | | | | | |
| Example 4 | 4 | 40% | 10% | 25% | | | | | |
| Example 5 | 5 | 40% | 10% | 25% | | | | | |
| Example 6 | 6 | 40% | 10% | 25% | | | | | |
| Example 7 | 7 | 40% | 15% | 10% | | | 10% | | |
| Example 8 | 8 | 40% | 20% | | 15% | | | | |
| Example 9 | 9 | 40% | 20% | | | 15% | | | |
| Example 10 | 10 | 40% | 10% | | 10% | 5% | | 5% | 5% |
| Example 11 | 11 | 40% | 15% | 15% | | | | | 5% |
| Example 12 | 12 | 40% | 10% | 10% | | | 10% | 5% | |
| Comparative Example 1 | 13 | 40% | 15% | 10% | | | 10% | | |
| Comparative Example 2 | 14 | 40% | 10% | 25% | | | | | |
| Comparative Example 3 | 15 | 40% | 10% | 10% | | | 10% | 5% | |

TABLE 2-continued

|  | Ink composition | | | | | | | | |
|---|---|---|---|---|---|---|---|---|---|
|  | Penetrating agent | | | | | | | pH adjusting agent | | antiseptic and antifungal agent |
|  | 2E13 HD | FS-300 | LS-106 | CS 3-1 | CS 3-2 | CS 4-1 | CS 4-2 | AEPD | KOH | LV |
| Example 1 |  |  | 1% |  |  |  |  |  | 0.1% | 0.1% |
| Example 2 | 2% | 1.5% |  |  |  |  |  |  | 0.1% | 0.1% |
| Example 3 | 2% | 1.5% |  |  |  |  |  | 0.5% |  | 0.1% |
| Example 4 | 2% |  |  | 0.1% |  |  |  | 0.5% |  | 0.1% |
| Example 5 | 2% |  |  |  | 0.1% |  |  | 0.5% |  | 0.1% |
| Example 6 | 2% |  |  | 0.1% |  | 0.1% |  | 0.5% |  | 0.1% |
| Example 7 |  | 2.5% |  |  |  |  | 0.1% | 0.5% |  | 0.1% |
| Example 8 | 2% |  |  |  | 0.05% |  | 0.1% | 0.5% |  | 0.1% |
| Example 9 | 2% |  |  |  | 0.05% |  | 0.1% | 0.5% |  | 0.1% |
| Example 10 | 1% | 2.5% |  |  |  | 0.1% |  | 0.5% |  | 0.1% |
| Example 11 | 1% |  | 1% |  |  | 0.1% |  |  | 0.1% | 0.1% |
| Example 12 |  |  |  | 0.05% |  |  |  | 0.5% |  | 0.1% |
| Comparative Example 1 |  | 2.5% |  |  |  |  | 0.1% | 0.5% |  | 0.1% |
| Comparative Example 2 | 2% | 1.5% |  |  |  |  |  | 0.5% |  | 0.1% |
| Comparative Example 3 |  |  |  | 0.05% |  |  |  | 0.5% |  | 0.1% |

Abbreviation
GLY: glycerin
13 BD: 3-methyl-1,3-butane diol
MBD: 1,3-butanediol
EHO: 3-ethyl-3-hydroxymethyl oxetane
DMMPA: N,N-dimethyl-β-methoxy propion amide
DMBPA: N,N-dimethyl-β-buthoxy propion amide
2P: 2-pyrrolidone
2E13HD: 2-ethyl-1,3-hexane diol
FS-300: ZONYL FS-300 (polyoxy alkylene (C2 to C3)-2-perfluoroalkyl (C4 to C16) ethyl ether, solid portion: 40%, manufactured by Du Pont Kabushiki Kaisha)
LS-106: EMALGEN LS-106 (Polyoxyethylene polyoxypropylene alkyl ether, manufactured by KAO CORPORATION)
AEPD: 2-amino-2-ethyl-1,3-propane diol
KOH: 0.1 normal KOH aqueous solution
LV: PROXEL LV (anti-septic and anti-fungal agent, manufactured by AVECIA GROUP)

The evaluation items and the evaluation methods for the dispersion elements and ink for inkjet recording manufactured in Examples and Comparative Examples are described below.

1. Measuring of Circularity

Take images of the ink for inkjet recording manufactured in Examples and Comparative Examples by a transmission electron microscope (TEM) (JEM-2100, manufactured by JEOL LTD.) and enlarge them with a magnifying power of 250,000 to 1,500,000.

Select a particle image arbitrarily from the TEM images and calculate the circularity of the particle as the difference between the radii of two concentric circles which are determined as a circumscribing and an inscribed circle that sandwich the contour of the particle when the gap between the two circles is at least.

Repeat this calculation for other 20 particles to obtain the circularity and the diameter of each particle.

The average of the diameter of the inscribed circles of the ink particles manufactured in Examples and Comparative Examples and the ratio of the particles having a diameter of inscribed circles of from 5 nm to less than 50 nm with a circularity of 2 nm or less for the 20 measured particles are shown in Table 3.

2. Measuring of Viscosity

The measuring results of the viscosity of the ink for inkjet recording manufactured in Examples and Comparative Examples and the changing ratio of the viscosity thereof after a one-month preservation at 50° C. in a sealed state for one moth are shown in Table 3.

The viscosity is measured by a rotation system viscometer (RE-80L, manufactured by TOKI SANGYO CO., LTD.) with a cone rotor of 1° 34'×R24, a sample liquid amount of 1.2 ml, and a number of rotation per minute of 50 rpm at 25° C. for three minutes.

3. Evaluation of Discharging Stability

Set the ink for inkjet recording manufactured in Examples and Comparative Examples in a printer (IPSio Gx e5500, manufacture by RICOH CO., LTD.) having a configuration illustrated in FIGS. 1 and 2 and evaluate the discharging stability by the following method.

Continue printing by the printer for ten minutes while the nozzle plates described above are set therein.

After leaving the printer at 50° C. and 60% RH for one month with a moisture retention cap on the head surface while the ink is attached thereto, clean the head to return it to the same state as before the leaving.

Thereafter, conduct an intermittent printing test under the following conditions to evaluate the discharging stability.

That is, print the following printing pattern chart on 20 sheets continuously and halt printing for 20 minutes.

Repeat this cycle 50 times to print images on 1,000 sheets in total and thereafter print the printing pattern chart on one more sheet, which is observed with naked eyes to evaluate the image with regard to streaks, white out, disturbance of spraying of 5% chart solid portion according to the following criteria.

The printing pattern has a printing area of 5% for each color in the entire area of the sheet and is printed with each ink under 100% duty.

The printing condition is that the printing density is 600 dpi×300 dpi with one pass printing.

In the evaluation criteria, E and G are allowable.

The results are shown in Table 3.

Evaluation Criteria

E (Excellent): no streaks, no white out, no spraying disturbance observed in the solid portion G (Good): slight streaks, white out, spraying disturbance observed in the solid portion F (Fair): streaks, white out, spraying disturbance observed in the solid portion B (Bad): streaks, white out, spraying disturbance observed all over the solid portion 4. Measuring of Gloss (60°)

Fill the ink for inkjet recording manufactured in Examples and Comparative Examples in an inkjet printer (IPSiO GX e5500, manufactured by RICOH CO., LTD.) and select gradations of 0, 128, 192, and 255 among 256 gradations with one pas.

Use the following Recording Media a and b as the recording media for the printing test and measure the 60° gloss of the image after printing and drying by BYK GARDNER 4501 (manufactured by BYK GARDNER CO., LTD.).

Calculate the gloss difference $\Delta X (=|X0-X|)$ between the gloss X0 of 0 gradation (surface of a recording medium on which no image is printed) and the gloss X of each gradation

TABLE 3

| | Particles in TEM image | | | Viscosity | | |
|---|---|---|---|---|---|---|
| | | 5 nm < or = diameter of inscribed circle < or = 50 nm, Circularity < or = 2 nm | | | Changing rate at 50° C. | |
| | Average diameter of inscribed circle (nm) | Number of particles | Rate (%) | Initial | for one month preservation | Discharging stability |
| Example 1 | 31.6 | 10 | 50 | 8.0 | 5(%) | G |
| Example 2 | 26.3 | 12 | 60 | 8.9 | 3(%) | G |
| Example 3 | 34.5 | 15 | 75 | 6.2 | −2(%) | E |
| Example 4 | 34.0 | 17 | 85 | 6.8 | 3(%) | E |
| Example 5 | 31.6 | 16 | 80 | 7.1 | 0(%) | E |
| Example 6 | 30.6 | 16 | 80 | 5.5 | −1(%) | E |
| Example 7 | 14.3 | 20 | 100 | 5.0 | 1(%) | E |
| Example 8 | 29.0 | 13 | 65 | 8.1 | 2(%) | E |
| Example 9 | 15.4 | 19 | 95 | 12.1 | 3(%) | E |
| Example 10 | 17.9 | 12 | 60 | 11.1 | 5(%) | G |
| Example 11 | 12.8 | 14 | 70 | 10.5 | −4(%) | G |
| Example 12 | 36.1 | 12 | 60 | 6.6 | 3(%) | E |
| Comparative Example 1 | 14.2 | 9 | 45 | 8.9 | 6(%) | G |
| Comparative Example 2 | 65.3 | 3 | 15 | 6.5 | 8(%) | F |
| Comparative Example 3 | 22.3 | 1 | 5 | 12.3 | 25(%) | B | other than 0 gradation and evaluate the results according to the following evaluation criteria.

The results are shown in Tables 4 and 5. "E" and "G" are allowable in the evaluation criteria Recording Sheet CRYSPIA (manufactured by SEIKO EPSON CORP.): X0=64.4

MIRROR COAT Platinum (manufactured by OR PAPER CO., LTD.): X0=73.8

Evaluation Criteria

E (Excellent): $|\Delta X|$=or<10

G (Good): 10<$|\Delta X|$=or<20

F (Fair): 20<$|\Delta X|$=or<40

B (Bad): 40<$|\Delta X|$

5. Measuring of Color

Fill the ink for inkjet recording manufactured in Examples and Comparative Examples in an inkjet printer (IPSiO GX e5500, manufactured by RICOH CO., LTD.) and print a solid image (255 gradation) with one pass.

Use the Recording Media a and b described above as the recording media and measure the luminance of the image after printing and drying by a reflection type color spectrodensitometer (X-Rite 938, manufactured by X-Rite Incorporate).

From the obtained values a* and b*, calculate the saturation C $(=\{(a^*)2+(b^*)2\}^{1/2})$ and the ratio k (=C/C0) of C to

TABLE 4

| | Recording medium (CRYSPIA) | | | | |
|---|---|---|---|---|---|
| Recording media Ink | Gloss difference $\Delta X$ in recording media | | | Saturation k | Color deterioration ratio |
| | 128 gradation | 192 gradation | 255 gradation | 255 gradation | |
| Example 1 | E | E | G | E | E |
| Example 2 | E | E | E | G | G |
| Example 3 | E | E | E | E | E |
| Example 4 | E | E | E | E | E |
| Example 5 | E | E | E | G | E |
| Example 6 | E | E | E | G | E |
| Example 7 | E | E | E | E | E |
| Example 8 | E | E | E | E | E |
| Example 9 | E | E | E | E | E |
| Example 10 | E | E | G | E | E |
| Example 11 | E | E | G | E | E |
| Example 12 | E | E | G | E | E |
| Comparative Example 1 | E | G | F | F | E |
| Comparative Example 2 | G | F | B | F | E |
| Comparative Example 3 | G | F | B | B | E |

C0 (saturation value of standard color (Japan Color Ver. 2, cyan: 62.82, green: 77.64, yellow: 91.34, red: 83.64, magenta: 74.55, and blue: 54.78) and evaluate them according to the following criteria.

The results are shown in Tables 4 and 5.
"E" and "G" are allowable in the evaluation criteria
Evaluation Criteria
E (Excellent): k=or>1.1
G (Good): 1.1>k=or>1.0
F (Good): 1.0>k=or>0.9
B (Bad): 0.9>k 6. Light Resistance Using the ink for inkjet recording manufactured in Examples and Comparative Examples, irradiate the solid image (255 gradation) manufactured in one pass in the same manner as in the Measuring of Color with light by a xenon feed meter at a black panel temperature of 63° C. for 24 hours followed by measuring the change of the image density before and after the irradiation by a reflection type color spectrodensitometer (manufactured by X-Rite Incorporated) to obtain a color deterioration ratio r (%) according to the following Expression 1.

$$r(\%)=[1-(\text{image density after irradiation})/(\text{image density before irradiation})]\times 100 \quad \text{Expression 1}$$

The results are shown in Tables 4 and 5.
"E" and "G" are allowable in the evaluation criteria.
Evaluation Criteria
E (Excellent): r=or<5%
G (Good): 5%<r<or=10%
F (Fair): 10%<r<or=20%
B (Bad): 20%<r

TABLE 5

| Recording media Ink | Recording medium (MIRROR COAT Platinum) | | | | |
| --- | --- | --- | --- | --- | --- |
| | Gloss difference ΔX in recording media | | | Saturation k | Color deterioration ratio |
| | 128 gradation | 192 gradation | 255 gradation | 255 gradation | |
| Example 1 | E | G | G | E | E |
| Example 2 | E | G | E | G | G |
| Example 3 | E | E | E | E | E |
| Example 4 | E | E | E | E | E |
| Example 5 | E | E | G | E | E |
| Example 6 | E | E | G | E | G |
| Example 7 | E | E | E | E | E |
| Example 8 | E | E | E | G | E |
| Example 9 | E | E | E | E | E |
| Example 10 | E | E | G | E | E |
| Example 11 | E | G | E | G | G |
| Example 12 | E | E | G | E | E |
| Comparative Example 1 | G | F | F | B | G |
| Comparative Example 2 | E | B | B | B | G |
| Comparative Example 3 | E | F | B | F | E |

What is claimed is:

1. An ink composition comprising:
   organic pigment particles; wherein an organic pigment of the organic pigment particles is selected from the group consisting of α crystalline type metal free phthalocyanine, α crystalline type copper phthalocyanine, copper phthalocyanine modified by chlorine or bromine, quinacridone modified by methyl or chlorine, and diketopyrrolo pyrrole modified by methyl or chlorine;
   a hydrosoluble solvent;
   a dispersing agent; and
   water,
   wherein each of the organic pigment particles has a circularity of 2 nm or less, which is defined as a difference between radii of concentric circumscribing and inscribed circles of a contour of an image of each of the organic pigment particles taken by a transmission electron microscope when a gap between the concentric circumscribing circle and the inscribed circle is least,
   wherein the inscribed circle has a diameter of from 5 nm to less than 50 nm.

2. The ink composition according to claim 1, wherein the dispersing agent comprises compounds represented by following Chemical Structures 1 and 2:

$$A^1\text{—O—}(CH_2CH_2O)_j\text{—}SO_3M^1 \quad \text{Chemical Structure 1}$$

$$A^1\text{—O—}(CH_2CH_2O)_k\text{—}H \quad \text{Chemical Structure 2}$$

where, in the Chemical Structures 1 and 2, $A^1$ is selected from the group consisting of a branch-chained or straight-chained alkyl group having 8 to 12 carbon atoms, a β naphtyl group, a styrenized phenol group, and a distyrenized phenol group, j represents an integer of from 10 to 30, k represents an integer of from 20 to 40, and $M^1$ represents an alkali metal selected from the group consisting of Li, Na, and K or a cation group selected from the group consisting of ammonium, tetramethyl ammonium, triethylmethyl ammonium, phosphonium, tetramethyl phosphonium, methanol amine, and ethanol amine.

3. The ink composition according to claim 1, wherein the hydrosoluble solvent comprises at least one of 1,3-butane diol, 3-methyl-1,3-butane diol, 3-ethyl-3-hydroxy methyloxetane, N,N-dimethyl-β-methoxy propion amide, and N,N-dimethyl-β-buthoxy propion amide.

4. The ink composition according to claim 1, further comprising a penetrating agent comprising at least one of a polyol having eight or more carbon atoms, a glycol ether, a compound represented by Chemical Structure 3, and a compound represented by Chemical Structure 4:

$$Rf^1\text{—}CH_2CH(OH)CH_2O\text{—}(CH_2CH_2O)_m\text{-}Q \quad \text{Chemical Structure 3}$$

where, in the Chemical Structure 3, $Rf^1$ represents $-C_3F_7$ or $C_4F_9$, Q represents $-C_bH_{2b+1}$, where b represents an integer of from 11 to 19, $-CH_2CH(OH)CH_2-C_3F_7$, or $-CH_2CH(OH)CH_2-C_4F_9$, and m represents an integer of from 20 to 35;

$$HOR^1R^3C\text{—}(CH_2)_n\text{—}CR^2CR^4OH \quad \text{Chemical Structure 4}$$

where, in the Chemical Structure 4, $R^1$ and $R^2$ independently represent alkyl groups having three to six carbon atoms, $R^3$ and $R^4$ independently represent alkyl groups having one or two carbon atoms, and n represents an integer of from 1 to 6.

5. The ink composition according to claim 1, having a viscosity change rate of 5% or less after preserved at 50° C. for one month.

6. An inkjet recording method comprising:
   discharging the ink composition of claim 1 from an inkjet recording device upon application of a thermal energy thereto.

7. An inkjet recording method comprising:
   discharging the ink composition of claim 1 from an inkjet recording device upon application of a mechanical energy thereto.

8. An inkjet recorded material recorded by the ink composition of claim 1.

9. An inkjet recorded material recorded by the inkjet recording method of claim 6.

10. An image formed using the ink composition of claim 1.

* * * * *